(12) United States Patent
Sachdeva et al.

(10) Patent No.: US 11,444,902 B2
(45) Date of Patent: Sep. 13, 2022

(54) SURFACING MEDIA CONVERSATIONS AND INTERACTIVE FUNCTIONALITY WITHIN A MESSAGE VIEWER OF A MESSAGING SYSTEM

(71) Applicant: Microsoft Technology Licensing, LLC, Redmond, WA (US)

(72) Inventors: Ravin Sachdeva, Seattle, WA (US); Santosh Kumar, Sammamish, WA (US); Izis de Melo Moreira, Kirkland, WA (US); Luiz Gustavo Bustamante Magalhaes, Kirkland, WA (US); Ashutosh Kumar, Redmond, WA (US); Xuemin Liu, Sunnyvale, CA (US); Humberto Lezama Guadarrama, Redmond, WA (US); Yue Ma, Bellevue, WA (US); Amy Huyen Phuoc Nguyen, Bellevue, WA (US); Iuliana Chiriac, Sunnyvale, CA (US); Fernando Ruben Martinez Ovelar, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/072,489

(22) Filed: Oct. 16, 2020

(65) Prior Publication Data
US 2022/0124061 A1 Apr. 21, 2022

(51) Int. Cl.
*G06F 15/16* (2006.01)
*H04L 51/216* (2022.01)
*G06Q 10/10* (2012.01)
*H04L 51/04* (2022.01)

(52) U.S. Cl.
CPC ......... *H04L 51/216* (2022.05); *G06Q 10/107* (2013.01); *H04L 51/04* (2013.01)

(58) Field of Classification Search
CPC ........ H04L 51/16; H04L 51/04; G06Q 10/107
USPC .......................................................... 709/206
See application file for complete search history.

(56) References Cited

U.S. PATENT DOCUMENTS

| | | | |
|---|---|---|---|
| 8,583,738 B2 | 11/2013 | Zuckerberg et al. |
| 9,043,405 B2 | 5/2015 | Ly et al. |
| 9,252,973 B1 | 2/2016 | Lin et al. |
| 9,471,899 B2 | 10/2016 | Beyer et al. |
| 9,754,326 B2 | 9/2017 | Franco et al. |

(Continued)

OTHER PUBLICATIONS

Kelbe, Kevin, "How to Post Your Emails to Social Media", Retrieved From: https://web.archive.org/web/20181102021849/http:/blog.clickdimensions.com/how-to-post-your-emails-to-social-media/, Nov. 2, 2018, 3 Pages.

(Continued)

*Primary Examiner* — Imad Hussain
(74) *Attorney, Agent, or Firm* — Christopher J. Volkmann; Kelly, Holt & Christenson, PLLC

(57) ABSTRACT

A messaging system identifies a received message as a notification message from a conversation system in a media application. The messaging system obtains rendering information to render a current state of the conversation thread represented by the message. The message system renders the current state of the followed conversation thread, with actuators that provide interactive functionality allowing the user to interact with the conversation thread, in the message viewer of the user's messaging system.

17 Claims, 13 Drawing Sheets

(56) References Cited

U.S. PATENT DOCUMENTS

| | | | |
|---|---|---|---|
| 9,935,912 B2 | 4/2018 | Allen et al. | |
| 10,122,791 B2 | 11/2018 | Smarr et al. | |
| 10,701,022 B2 | 6/2020 | Carter et al. | |
| 2007/0157104 A1 | 7/2007 | Blain et al. | |
| 2008/0189622 A1 | 8/2008 | Sanchez et al. | |
| 2011/0196933 A1* | 8/2011 | Jackson | H04L 51/16 709/206 |
| 2013/0132864 A1 | 5/2013 | Panigrahi et al. | |
| 2013/0204952 A1 | 8/2013 | Everton et al. | |
| 2013/0219296 A1* | 8/2013 | Thazhmon | G06Q 10/107 715/752 |
| 2013/0326362 A1 | 12/2013 | Murray et al. | |
| 2013/0332849 A1 | 12/2013 | Santos | |
| 2014/0006977 A1 | 1/2014 | Adams | |
| 2015/0212984 A1 | 7/2015 | Bowden | |
| 2016/0344679 A1* | 11/2016 | Lane | H04L 51/063 |
| 2017/0104785 A1* | 4/2017 | Stolfo | G06F 40/295 |
| 2018/0004373 A1 | 1/2018 | Peacock et al. | |
| 2018/0337873 A1* | 11/2018 | Clark | H04L 51/16 |
| 2019/0012669 A1* | 1/2019 | Pearson | G06Q 20/389 |
| 2020/0366628 A1* | 11/2020 | Olivera | G06Q 50/01 |

OTHER PUBLICATIONS

"Work with Yammer from Outlook", Retrieved From: https://support.microsoft.com/en-us/office/work-with-yammer-from-outlook-fd695485-225b-410f-b24a-17f971b46b25, Retrieved Date: Aug. 25, 2020, 4 Pages.

Fischer, et al., "Email Clients as Decentralized Social Apps in Mr. Privacy", Retrieved From: https://mobisocial.stanford.edu/papers/hotpets11.pdf, 2011, 10 Pages.

George, Kevin, "Social Media Live Feeds in Email: How to Get Results That Wow", Retrieved From: https://www.sendible.com/insights/social-media-live-feeds-in-emails, Jun. 20, 2017, 15 Pages.

"Non Final Office Action Issued in U.S. Appl. No. 17/514,554", dated Jun. 16, 2022, 13 Pages.

\* cited by examiner

SURFACING MEDIA CONVERSATIONS AND INTERACTIVE FUNCTIONALITY WITHIN A MESSAGE VIEWER OF A MESSAGING SYSTEM

BACKGROUND

Computing system are currently in wide use. Some computing systems host services or other applications, such as social media applications, professional media applications or other such applications.

Some of the hosted applications, such as social and professional media applications, include a conversation system that allows a user can view and interact with conversations that are displayed in a thread that is made available by the conversation system as a media feed. The conversation system may manage and maintain multiple different conversation threads. A conversation thread may show comments or statements made by different participants in the conversation as well as various actions that are taken, such as "liking" a comment, replying to a comment, or other actions. Each of the actions has an associated actuator which, when actuated by a user, causes the system to navigate the user through a user experience that allows the user to take the action. When an action is taken, the state of the conversation thread is updated to reflect the action.

Many of the current applications with conversation systems also allow users to follow different conversations. When a user follows a conversation, then when some action is taken on the conversation thread, the user can be notified in various different ways.

In one example, the conversation system allows users to receive notifications when actions are taken on conversations that the user follows. For instance, some conversation systems allow the user to enter an electronic mail (email) address where a notification email will be sent by the conversation system, notifying the user, by email, that some action has taken place on the conversation thread that the user is following.

The discussion above is merely provided for general background information and is not intended to be used as an aid in determining the scope of the claimed subject matter.

SUMMARY

A messaging system identifies a received message as a notification message from a conversation system in a media application. The messaging system obtains rendering information to render a current state of the conversation thread represented by the message. The messaging system renders the current state of the followed conversation thread, with actuators that provide interactive functionality allowing the user to interact with the conversation thread, in the message viewer of the messaging system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some media applications generate conversation threads in a media feed and allow a user who is following a conversation to receive an email notification of actions that have taken place on the followed conversation thread. Currently, such email notifications are static in that the email notifications contain information indicative of an action that was taken on the conversation thread. The email notifications also often provide a link that the user can actuate in order to view the conversation thread but do not provide any interactive functionality that allows the user to interact with the conversation thread. However, once the user actuates the link, the user is navigated to the media application, itself, where the conversation thread is displayed within the media application, for viewing and interaction by the user. Thus, if the user wishes to view and interact with the conversation thread, the user is first navigated away from the email application.

The present discussion thus proceeds with respect to a messaging system (such as an email system) that detects a message that represents a notification corresponding to a conversation thread from a conversation system in a media application. The messaging system obtains rendering information to render a current state of the conversation thread with actuators providing interactive functionality. The messaging system then renders a live view of the current state of the conversation thread, with the actuators, within a message viewer (such as a reading pane) of the messaging system. User interactions can also be detected, from within the message viewer, in order to update the state of the conversation thread.

The present description can be made with respect to many different types of messaging systems. It is made herein with respect to an example in which the messaging system is an email system. This is for the sake of example only.

Email systems can take different forms. Some email systems are loaded onto a client computing system. Email messages are sent and received through a hosted email service, but the inbox of the user resides on the client computing system. Other email systems are web applications where the user of the client computing system uses a browser to access his or her email system, on a remote email service, where the inbox of the user is hosted. In such a web-app system, the user launches a browser and uses the browser to access his or her mail box, hosted on the remote service. The present discussion thus proceeds with respect to a number of different mechanisms by which rendering information can be obtained in the different types of email systems and in which a current state of a conversation thread is rendered, with interactive functionality, in a reading pane of a user's inbox.

Figure 1:
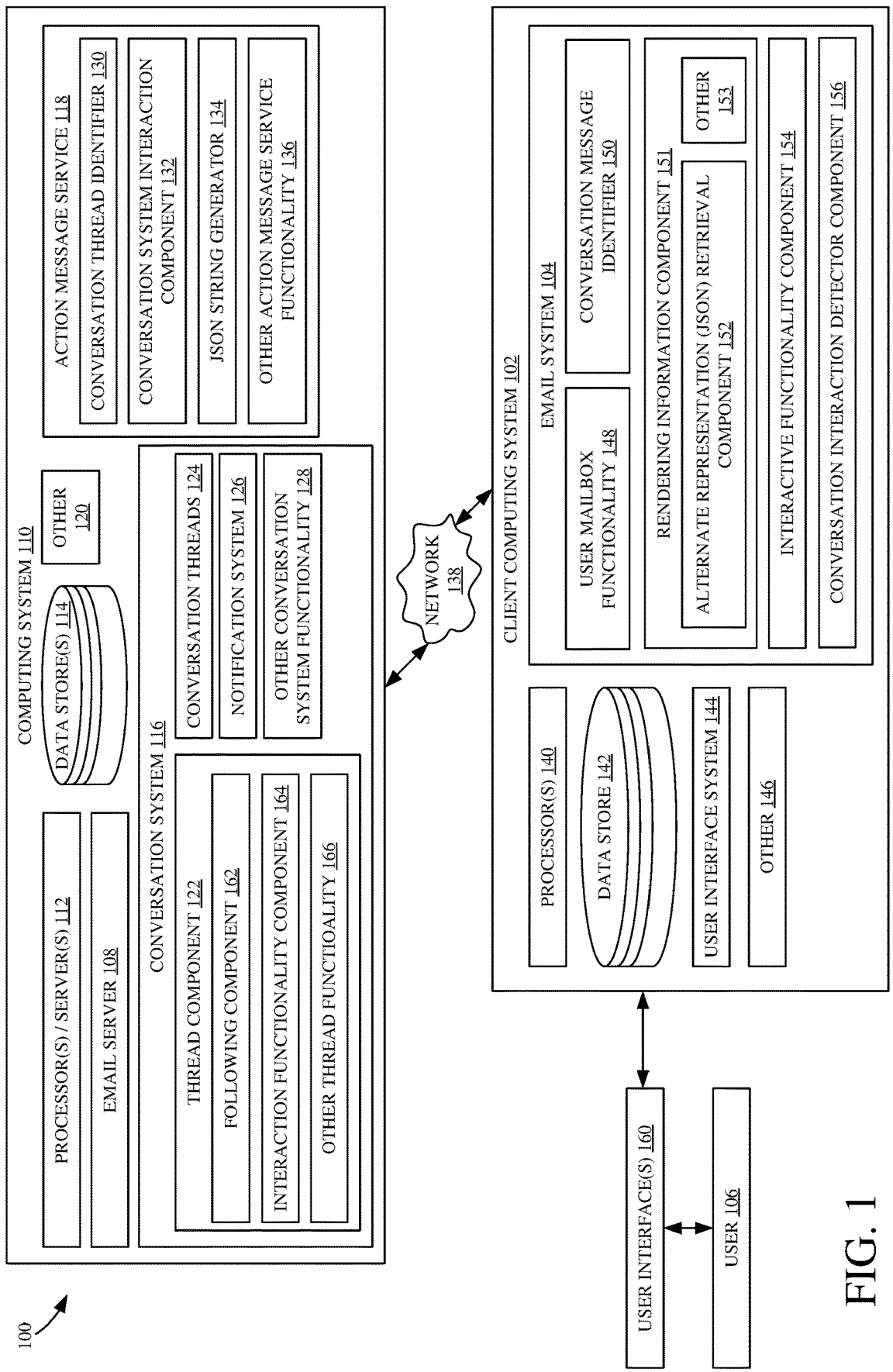
FIG. 1 is a block diagram of one example of a computing system architecture.

FIG. 1 is a block diagram showing one example of a computing system architecture 100 in which a client computing system 102 has a messaging system comprising an email system 104 that a user 106 accesses. The email system 104 uses an email server 108 in a remote server computing system 110 in order to send and receive email messages to other users. Before describing the operation of architecture 100 in more detail, a brief description of some of the items in architecture 100, and their operation, will first be provided.

Computing system 110 illustratively includes one or more processors or servers 112, data store 114, conversation system 116, email server 108, action message service 118 and it can include other items 120. Conversation system 116 illustratively comprises, or comprise part of, a media system (such as a social media system, professional media system, etc.) that manages, maintains and outputs a conversation thread as a media feed and allows users to follow and interact with those conversation thread. Thus, conversation system 116 illustratively includes thread component 122, one or more conversation threads 124, notification system 126, and it can include a wide variety of other conversation system functionality 128. Thread component 122 can include following component 162, interaction functionality component 164 and other thread generation, and management functionality 166. Action message service 118 illustratively includes conversation thread identifier 130, conversation system interaction component 132, JSON string generator 134, and it can include a wide variety of other message service functionality 136.

Client computing system 102 is connected to computing system 110 over network 138. Therefore, network 138 can be any of a wide variety of different types of networks, such as a wide area network, a local area network, a near field communication network, a cellular communication network, or any of a wide variety of other networks or combinations of networks.

Client computing system 102 illustratively includes one or more processors 140, data store 142, user interface system 144, email system 104, and it can include a wide variety of other computing system functionality 146. Email system 104, itself, can include user mailbox functionality 148, conversation message identifier 150, rendering information component 151 which can include alternate representation (JSON) retrieval component 152 or other items 153, interactive functionality component 154, thread interaction detector component 156, and it can include a wide variety of other email functionality 158. FIG. 1 also shows that user interface system 144 can generate one or more user interfaces 160 for interaction by user 106. User 106 thus interacts with user interfaces 160 in order to manipulate and control client computing system 102 and some portions of computing system 110. While FIG. 1 shows one example of how functionality can be divided between computing systems 102 and 110, the functionality can be divided in other ways as well such as by having more or less functionality disposed on either computing system 102 or 110 or disposed elsewhere and accessed by computing systems 102 or 110 or both. For instance, client computing system 102 can run more functionality of conversion system 116 and/or action message service 118, or computing system 110 can run more functionality of email system 104. These are only examples of how functionality can be divided differently.

User mailbox functionality 148 illustratively performs email functionality to maintain the user's inbox, and to process user interactions (such as interactions selecting a message to read, reply interactions, forward interactions, etc.).

As discussed above, conversation system 116 may be, or may be part of, a social media system, a professional media system, or another type of system in which users can follow and interact with conversations to create a conversation thread.

Following component 162 illustratively allows users to follow a conversation. When a user follows a conversation, then notification system 126 updates that user when there are changes made to the conversation thread. For instance, if the conversation is configured as a feed on the user's conversation system, then the user's feed will be updated when the conversation thread is updated. Similarly, in some examples, notification system 126 allows users who are following a conversation to identify their email address. When an update occurs on the conversation thread that a user is following, then notification system 126 can send a notification email to the user's email address to update that user as to the state of the conversation thread. Interaction functionality component 164 illustratively allows the user to initiate a conversation and to interact with items in the conversation thread. For instance, a user may be able to post a comment in a conversation, "like" the comment of another user, forward the comment, respond by email or using another form of communication, or perform other interactive functions. Therefore, in one example, interaction functionality component 164 exposes actuators, such as text boxes, links, buttons, or other actuators on a user interface display and allows users to interact with those actuators in order to participate in a conversation and interact with items in a conversation thread.

Conversation system 116 can thus maintain a plurality of different conversation threads, updating the current state of those threads, as users interact with the conversation threads 124. Conversation system 116 also notifies followers of the various conversation threads 124, as they are updated.

Email server system 108 illustratively facilitates sending and receiving of email messages among users. Email server system 108 can also, in some examples, facilitate other operations such as calendaring operations, task list operations, meeting operations, among others.

Action message service 118 illustratively processes certain types of email messages so that users can take actions from within their inbox, in responding to an email message. In one example, when notification system 126 in conversation system 116 sends a notification email indicating that there has been an update to a conversation thread 124 that user 106 is following, notification system 126 may include, in that notification email, a value identifying it as an actionable message. In one example, the value may be located in an email header. The value may include a thread identifier (thread ID) identifying the particular conversation thread 124 that is the subject of the notification, or the value may include other items. When the email system 104 in client computing system 102 receives such an email, then conversation message identifier 150 can identify the value in the email message, indicating that it is a notification email message containing a notification of an update to a conversation thread. Rendering information component 151 then obtains rendering information to render a current state of the conversation thread. For example, alternative representation (JSON) retrieval system 152 can then provide information from the notification email to action message service 118. Conversation thread identifier 130 obtains the conversation thread ID from the header of the email and conversation system interaction component 132 interacts with conversation system 116 to obtain the current state of the particular conversation thread 124 identified by the conversation thread ID in the notification email.

JSON string generator 134 then generates an alternative representation of the conversation thread (which is an alternative to what would normally be shown in the user's inbox) as a JSON string which is then provided back to alternative representation retrieval component 152. Interactive functionality component 154 then generates a representation of an interactive display, within the message viewer (e.g., reading pane) of the user's email inbox, with actuators that allow the user to interact with the current state of the conversation thread, from within the message viewer of the user's inbox. User interface system 144 then displays the interactive display within the message viewer so the user can interact with the conversation thread. Thread interaction detector component 156 detects user interactions with the actuators that are displayed on the conversation thread. For instance, the user can "like" a comment in the conversation thread, by actuating a "like" actuator on the user interface display. This is detected by conversation interaction detector 156.

It should also be noted that the same JSON string can be provided to one or more different interactive functionality components 154. Each different interactive functionality component 154 can generate a different representation of the interactive display that can be displayed on different user interface systems 144.

Conversation system interaction component 132 communicates to conversation system 116 that the conversation thread has been updated because the user has "liked" a comment. Thread component 122 then updates the corresponding conversation thread 124 and sends back the updated state of the conversation thread to conversation system interaction component 132. JSON string generator 134 then generates a new JSON string to represent the updated state of the conversation thread, and provides that JSON string to alternative representation retrieval component 152 which again uses interactive display component 154 to generate a display of the updated state of the conversation thread, along with actuators that allow the user to perform interaction functionality on the displayed conversation thread.

Figure 2:
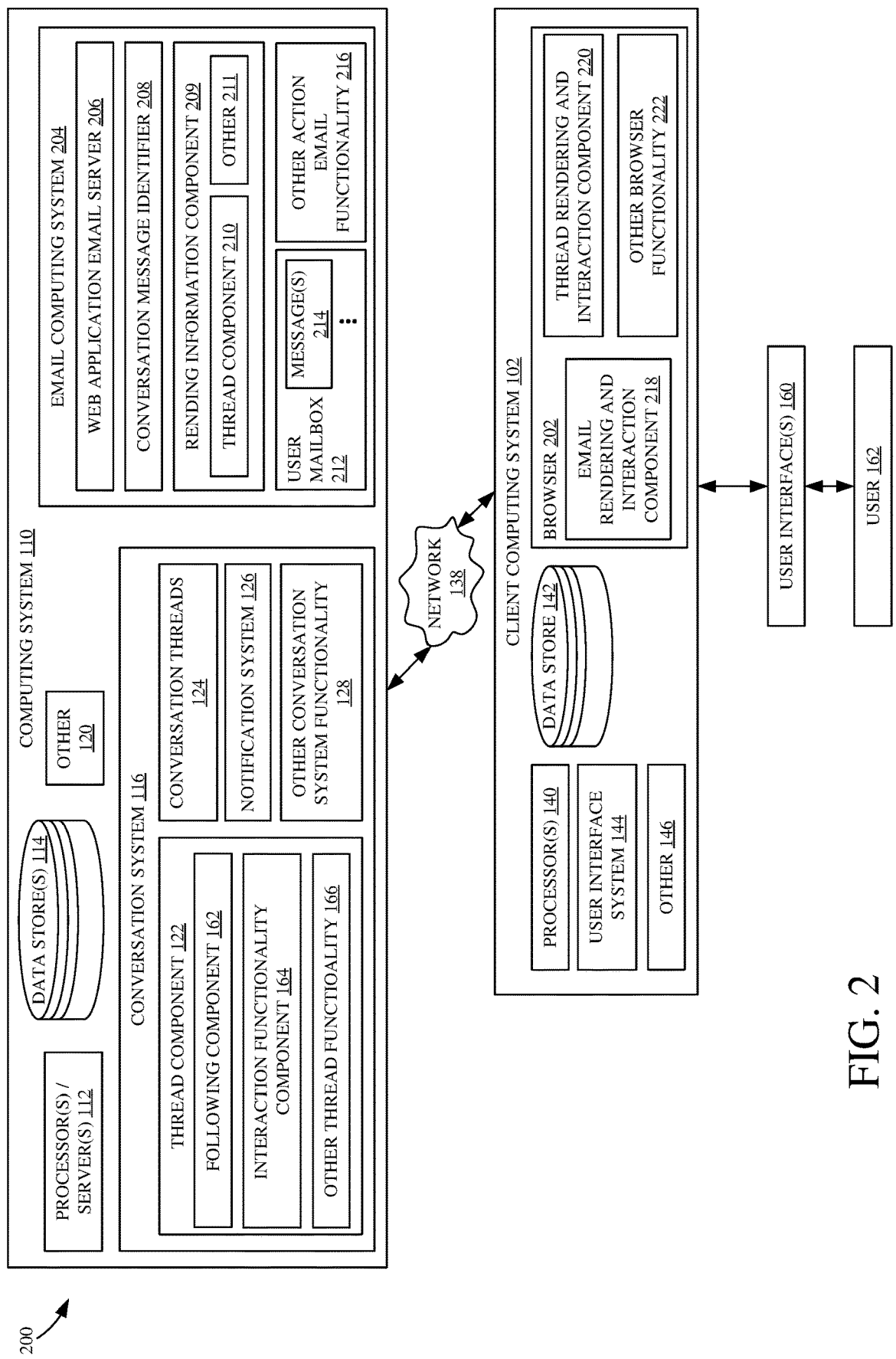
FIG. 2 is a block diagram of another example of a computing system architecture.

FIG. 2 is a block diagram of one example of computing system architecture 200. Architecture 200 is similar, in some ways, to architecture 100 shown in FIG. 1, and similar items are similarly numbered. However, unlike architecture 100, client computing system 102, in architecture 200, uses a browser 202 to access a messaging system such as email computing system 204 hosted by computing system 110. Email computing system 204 includes a web application email server 206, conversation message identifier 208, rendering information component 209 which can include thread component 210 and other items 211, user mailboxes 212 for various users, which include messages 214, and it can include a wide variety of other email functionality 216. In the example shown in FIG. 2, thread component 210 can be a copy of thread component 122 used by conversation system 116. Therefore, thread component 210 can include following component 162, interaction functionality component 164, and other thread functionality 166. In one example, conversation system 116 can publish its thread component 122 so that it can be accessed or obtained by email computing system 204. Therefore, whenever any changes are made to the functionality of thread component 122, a new version of thread component 122 can be published and accessed by email computing system 204 so that thread component 210 has the latest functionality of conversation system 116.

While FIG. 2 also shows an example in which functionality is distributed between computing systems 102 and 110, the functionality can be divided in other ways as well such as by having more or less functionality disposed on either computing system 102 or 110 or disposed elsewhere and accessed by computing systems 102 or 110 or both. For instance, browser 202 can run more functionality from email computing system 204 or conversation system 116 on client computing system 102. This is just one example of how functionality can be divided differently.

Web application email server 206 maintains the user mailboxes 212 for user 162 so that user 162 can use browser 202 to access his or her user mailbox 212 and the messages 214 therein. User 162 can thus use browser 202 to perform email functions, such as to open, read, generate, and delete email messages. User 162 can also use browser 202 to perform other functionality, such as send email messages, add attachments, etc.

Browser 202 can include email rendering and interaction component 218, which renders the mailbox 212 for user 162, when user 162 uses browser 202 to access his or her email system. Email rendering and interaction component 218 also detects user interaction with the rendered mailbox, such as when the user selects a message to read, or actuates another actuator, such as a reply actuator, a delete actuator, a send actuator, etc. Component 218 provides an indication of those interactions to email computing system 204 where they can be processed by web application email server 206. Thread rendering and interaction detection component 220 is used by browser 202 to render a current state of a conversation thread within the message viewer of the user's mailbox. Component 220 also detects user interactions with the current state of the conversation thread and communicates those interactions back to thread component 210.

In the example shown in FIG. 2, when user 162 receives a notification email from notifications system 126, that notification email is sent through web application email server 206 to the user mailbox 212 of user 162. When the message is received, the message illustratively contains a value or some marking identifying it as a notification message from conversation system 116. In one example, the value is sent as a thread identifier in a header of the email message. This is detected by conversation message identifier 208 which then uses thread component 210 to generate a representation of the current state of the conversation that is the subject of the notification email. For instance, interaction functionality component 164 can generate a representation of the conversation thread, including the interactive functionality actuators. Then, when user 162 selects the notification message to read it (using browser 202), interaction functionality component 164 can provide the representation of the current state of the conversation thread to thread rendering and interaction detection component 220 in browser 202, which renders the current state of the conversation thread, including the interaction functionality actuators, in the message viewer of the user's inbox. When user 162 interacts with the conversation thread (such as by actuating one of the actuators) this is detected by thread rendering and interaction detection component 220 and an indication of this is provided to thread component 210 in email computing system 204. Thread component 210 then processes that interaction to update the state of the conversation thread and communicates the updated state to thread component 122 in conversation system 116. Thread component 210 also provides the updated state of the conversation thread back to thread rendering and interaction detection component 220 in browser 202, which uses user interface system 144 to display the updated state of the conversation thread to user 162.

Figure 3:
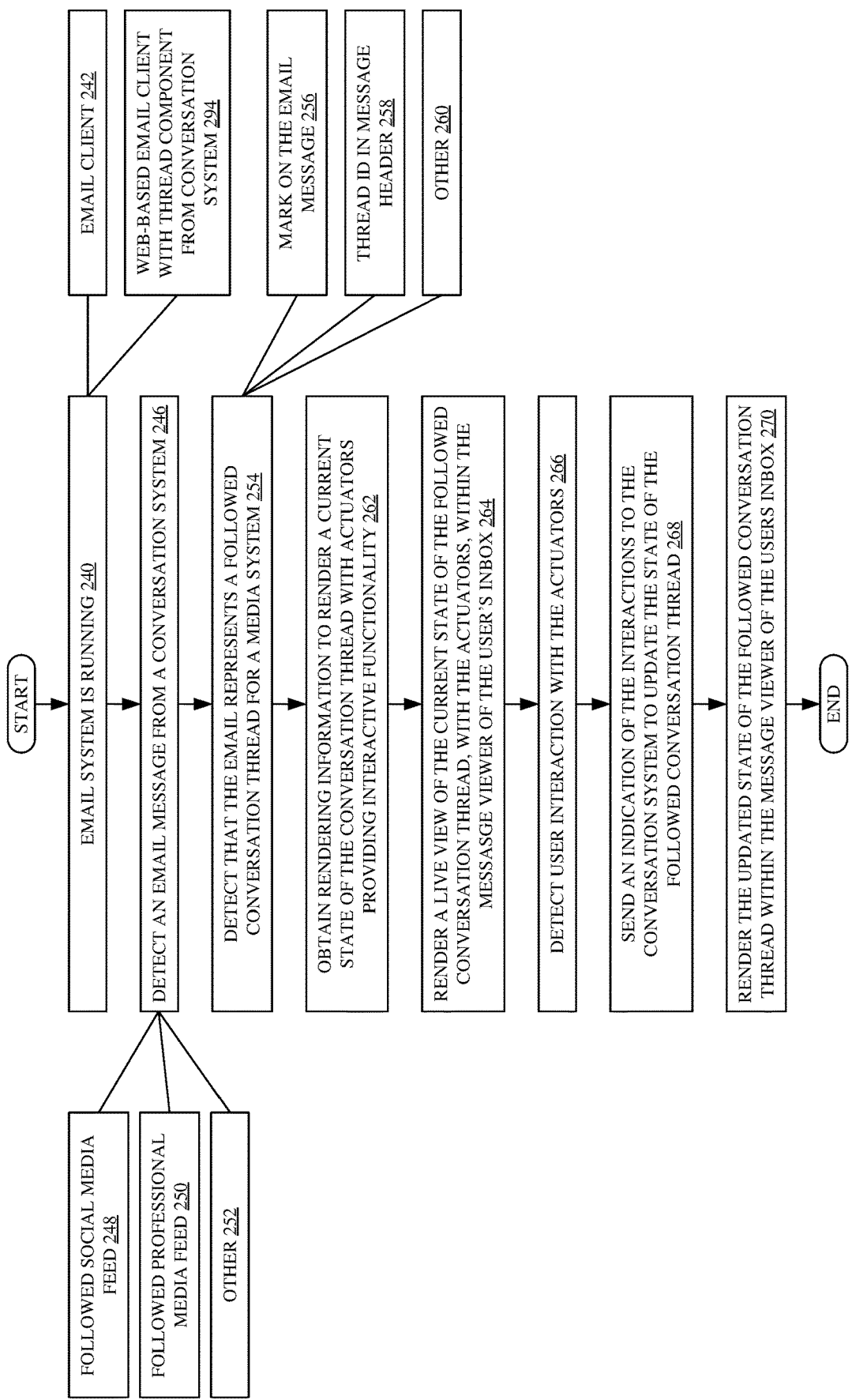
FIG. 3 is a flow diagram illustrating the operation of the architectures shown in FIGS. 1 and 2 in displaying a conversation thread within a message viewer of an email application, with interactive functionality.

FIG. 3 is a flow diagram illustrating one example of the operation of architectures 100 and 200, in general, in receiving from conversation system 166 a notification email indicative of a modification to a conversation thread 124 that user 162 is following, or has otherwise been configured so that user 162 is notified of updates to the conversation thread 124.

It is first assumed that an email system is running in a computer architecture. This is indicated by block 240 in the flow diagram of FIG. 3. In one example, the email system is an email client disposed on a client computing system, such as email system 104 on client computing system 102. This is indicated by block 242. In another example, the email system uses a web-based email client with a thread component 210 from the conversation system 116. This is indicated by block 244 in the flow diagram of FIG. 3.

The email system then detects a notification email message from conversation system 116. Detecting an email message from a conversation system is indicted by block 246 in the flow diagram of FIG. 3. For instance, in FIG. 1, conversation message identifier 150 identifies the notification message as one being sent by conversation system 116, notifying the user of an update to the state of a conversation thread. The notification email message may notify the user of an update to a social media feed that the user is following. This is indicated by block 248 in the flow diagram of FIG. 3. The notification email message may be a notification indicating that a professional media feed that the user is following has been updated. This is indicated by block 250. The notification email message can take other forms as well, and this is indicated by block 252.

Detecting that the email message represents an update to a followed conversation thread for a media system (or conversation system 116), is indicated by block 254 in the flow diagram of FIG. 3. Detecting this may be done in a wide variety of ways. It may be that conversation message identifier 150 (from FIG. 1) or conversation message identifier 208 (from FIG. 2) identify that the email message is a notification message from a conversation system 116 by identifying a mark on the email message. This is indicated by block 256 in the flow diagram of FIG. 3. It may be that the mark on the email message is a thread identifier (thread ID) in a message header. This is indicated by block 258. The message may be identified as a notification message representing an update to a conversation thread in other ways as well, and this is indicated by block 260.

The email system then obtains rendering information to render a current state of the conversation thread, with actuators providing interactive functionality, within the message viewer of the user's mailbox. This is indicated by block 262 in the flow diagram of FIG. 3. For instance, in the example illustrated in FIG. 1, alternative representation (JSON) retrieval component 152 in rendering information component 151 can send the email message, or a portion of the email message, to action message service 118 where conversation thread identifier 130 obtains the conversation thread ID and conversation system interaction component 132 interacts with conversation system 116 to obtain the current state of the identified conversation thread, based on the thread ID. JSON string generator 134 then generates a JSON string representation of the current state of the identified conversation thread and returns it to retrieval component 152. In the example shown in FIG. 2, conversation message identifier 208 can indicate to thread component 210 in rendering information component 209 that the current state of the identified conversation thread is to be obtained. Interaction functionality component 164 then generates the information so that the current state of the conversation thread, with corresponding functionality actuators, can be rendered by browser 202 in the reading pane of the user's mailbox.

The email system then renders a live view (meaning that the user can interact with it) of the current state of the conversation thread, with the functionality actuators, within the message viewer (e.g., reading pane) of the user's inbox. This is indicated by block 264 in the flow diagram of FIG. 3. In the example shown in FIG. 1, for instance, interactive display component 154 illustratively renders the alternative representation (JSON string) indicative of the current state of the conversation thread, with the functionality actuators for interaction by user 106. In the example illustrated in FIG. 2, for instance, thread rendering and interaction detection component 220, in browser 202, renders the information provided by thread component 210, to show the current state of the conversation thread, along with the functionality actuators.

The email system then detects user interaction with the actuators on the displayed conversation thread. This is indicated by block 266 in the flow diagram of FIG. 3. The email system then sends an indication of the interactions with the conversation thread to update the state of the conversation thread. This is indicated by block 268 in the flow diagram of FIG. 3. The email system then renders the updated state of the conversation thread within the message viewer (e.g., reading pane) of the user's inbox. This is indicated by block 270 in the flow diagram of FIG. 3.

Figure 4:
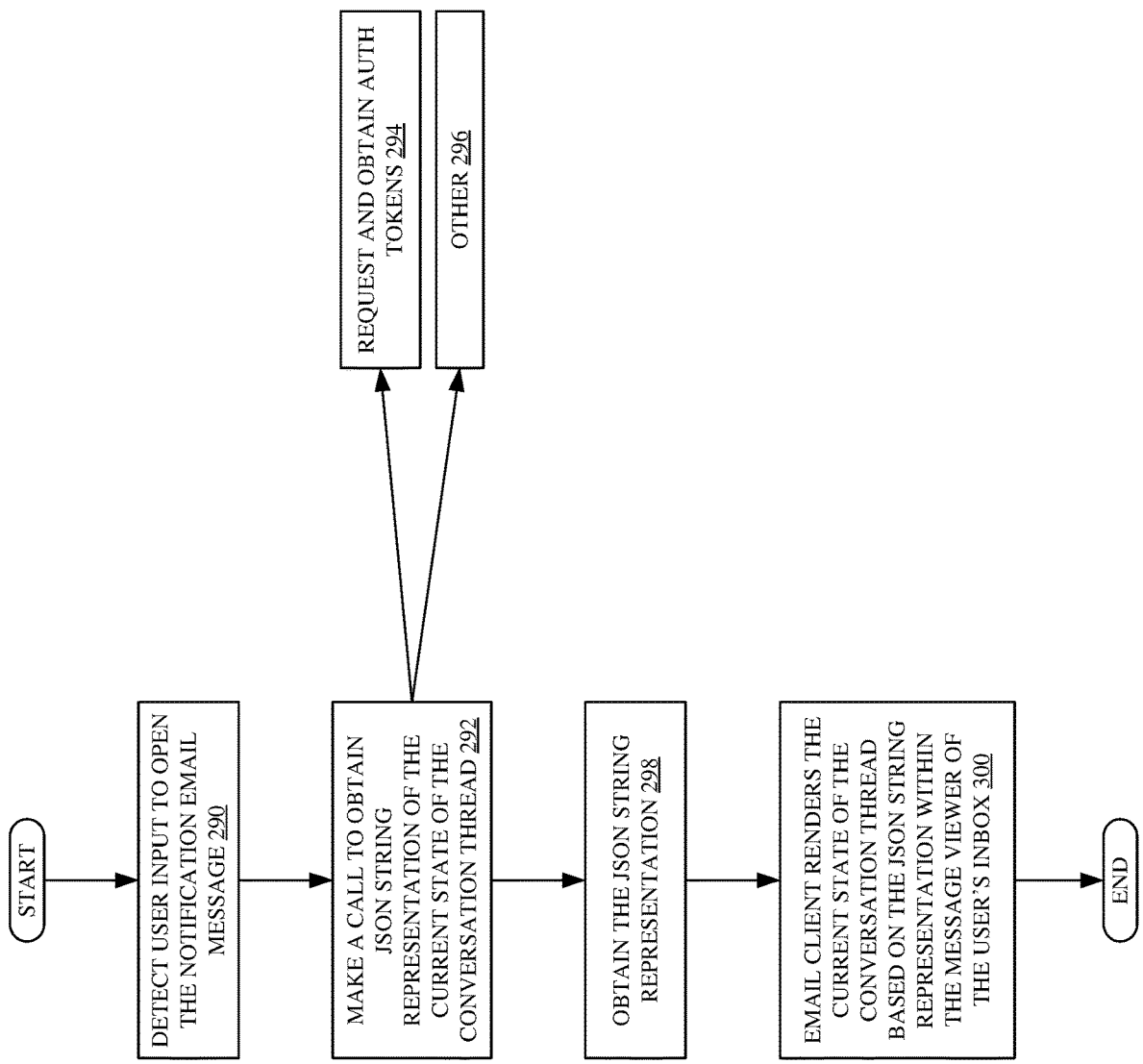
FIG. 4 is a flow diagram illustrating one example of the operation of the architecture illustrated in FIG. 1, in rendering a conversation thread, in more detail.

In addition, it should be noted that each time user 162 goes back to the notification email message and selects it for display, the same process can be performed so that the current state of the conversation thread is rendered, even if there have been updates to the conversation thread since the last time the conversation thread was rendered to the user. FIG. 4 is a flow diagram illustrating the operation of the architecture shown in FIG. 1, in obtaining and rendering the alternate representation of the current state of the conversation thread, in more detail. It is first assumed that the notification email message has been received and the user 106 provides an input to open the notification email message. This is indicated by block 290 in the flow diagram of FIG. 4. Conversation message identifier 150 identifies the thread ID and identifies the message as a notification message (if it has not done so already) and alternate representation (JSON) retrieval component 152 makes a call to action message service 118 to obtain a JSON string representation of the current state of the conversation thread. This is indicated by block 292. In doing so, component 152 may also handle obtaining authorization tokens and authentication tokens to request and receive the JSON string representation, or this can be done by a separate authorization/authentication system. Requesting and obtaining authorization and authentication tokens is indicated by block 294. Retrieval component 152 can request the JSON string representation in other ways as well, and this is indicated by block 296.

Conversation thread identifier 130 then uses the conversation thread ID and conversation system interaction component 132 to obtain the current state of the identified conversation thread from conversation system 116. JSON string generator 134 generates the JSON string representing the current state of the conversation thread and returns the JSON string to retrieval component 152. This is indicated by block 298 in the flow diagram of FIG. 4. Interactive display component 154 in the email client system 104 then renders the current state of the conversation thread, based upon the JSON string representation, within the message viewer (e.g., reading pane) of the user's inbox. The rendering also includes the actuators that allow the user 106 to interact with that conversation thread as well. This is indicated by block 300 in the flow diagram of FIG. 4.

Figure 5:
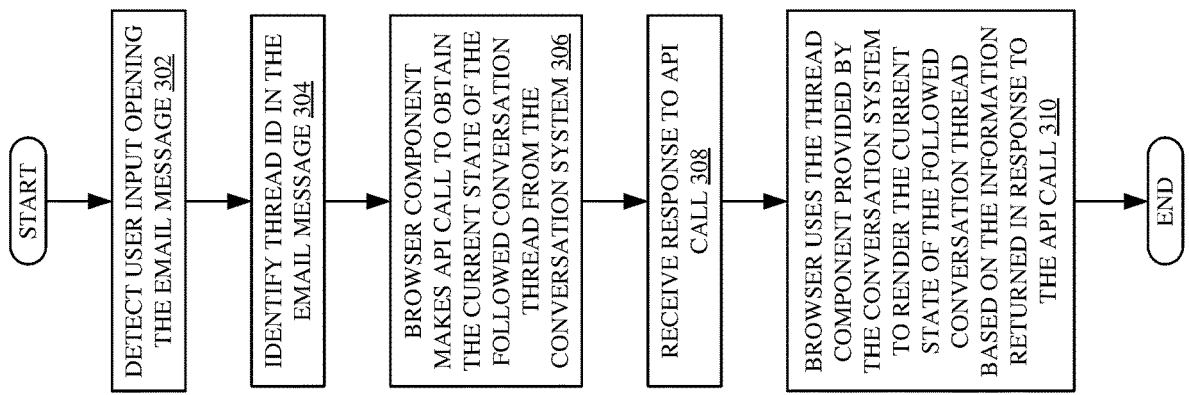
FIG. 5 is a flow diagram illustrating one example of the operation of the architecture illustrated in FIG. 2, in rendering a conversation thread, in more detail.

FIG. 5 is a flow diagram illustrating one example of the operation of the architecture 200 shown in FIG. 2, in obtaining rendering information that can be used to render the current state of the conversation thread that is the subject of the notification email message. It is thus assumed that the notification email message has been received by web application email server 206 and that the user 162 has provided an input indicating that the user wishes to open the notification email message. This is indicated by block 302 in the flow diagram of FIG. 5. Conversation message identifier 208 then identifies the thread ID in the email message indicating the conversation thread that the notification email message represents. This is indicated by block 304 in the flow diagram of FIG. 5. Thread component 210 then makes an API call to conversation system 116 to obtain the current state of the conversation thread from conversation system 116. This is indicated by block 306 in the flow diagram of FIG. 5. Thread component 210 receives a response to the API call, and interaction functionality component 164 generates rendering information that can be used by thread rendering and interaction detection component 220 in browser 202 to render the current state of the conversation thread, based upon the information returned in the response to the API call. Receiving a response to the API call is indicated by block 308 and using thread component 210 to generate the rendering information that can be used to render the current state of the conversation thread is indicated by block 310.

Again, it will be noted that, in one example, conversation system 116 can publish a current version of the thread component 122 where it can be obtained (as thread component 210) by email computing system 204. In one example, email computing system 204 may intermittently check to ensure that it has the most recent version of the thread component so that any new functionality that may be added by conversation system 116 will be available in the thread component being used by email computing system 204.

Figure 6:
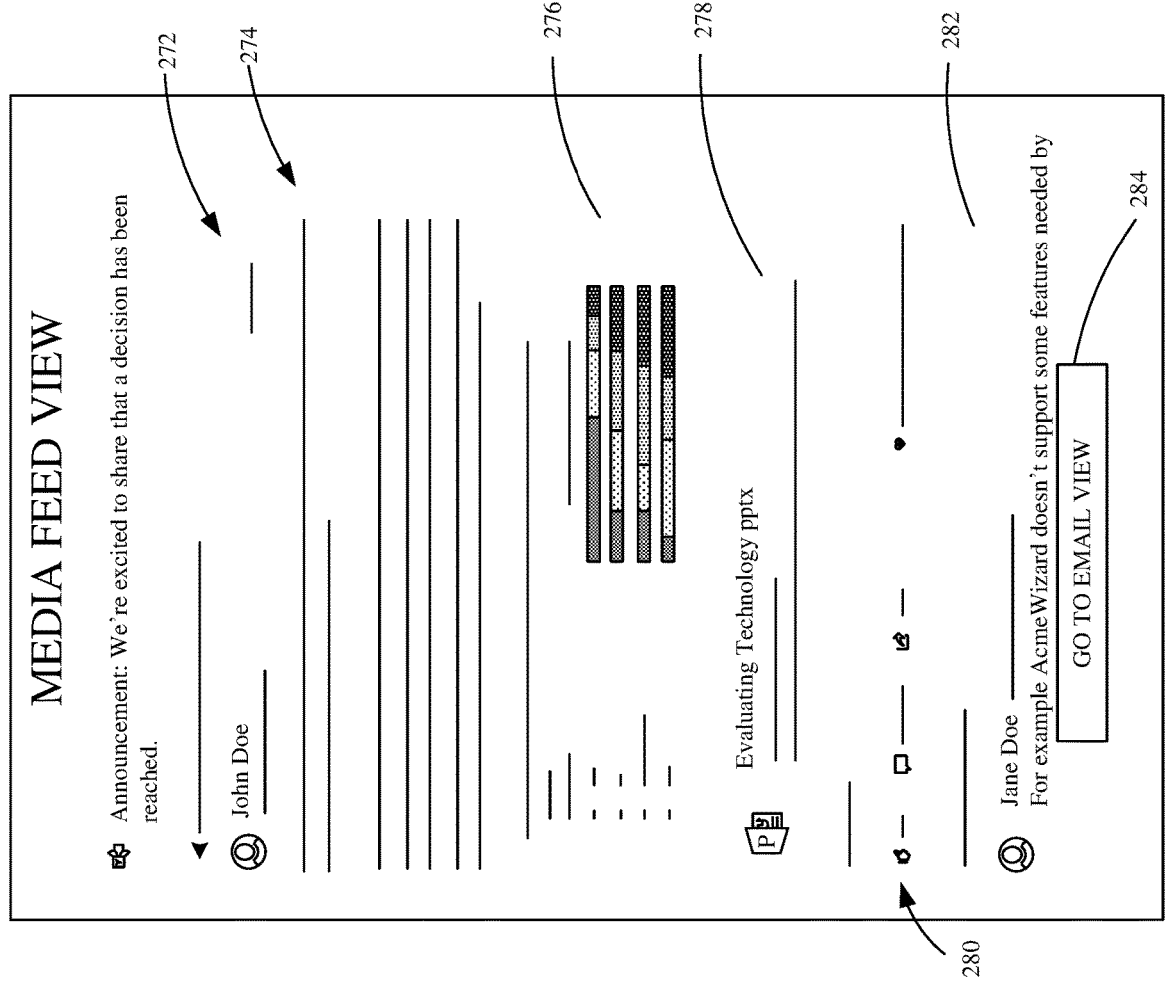
FIG. 6 is a user interface display showing one example of a rendered conversation thread within a message viewer of an inbox.
Figure 7:
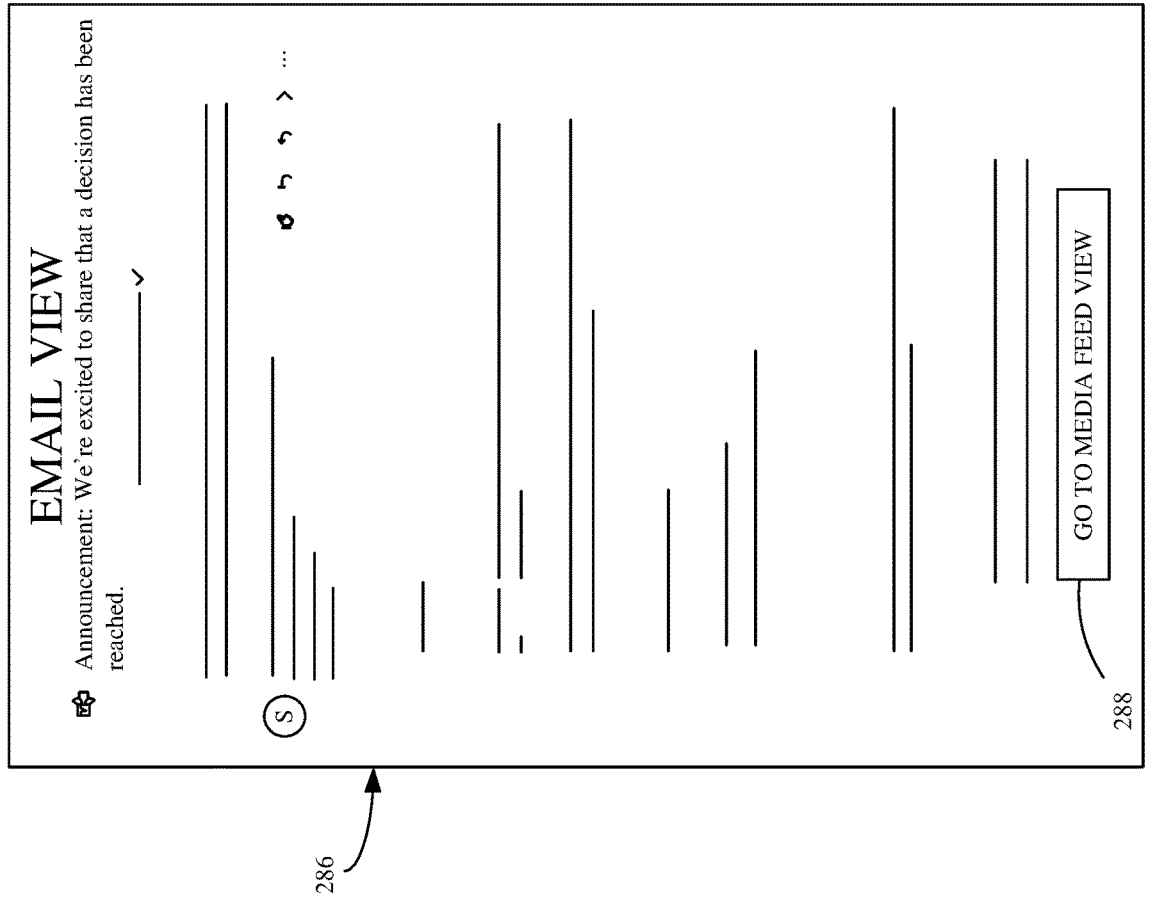
FIG. 7 is a user interface display showing one example of an email view of a followed conversation thread in a message viewer of an inbox.

In one example, the user may wish that the representation of the conversation thread is displayed in a static email view, in which the full functionality of the conversation system is not provided. For example, it may be that a different user has replied to the email notification. In that case, the user wishes to see the email thread corresponding to the notification email message. Thus, in one example, the user is provided with actuators to switch between the static email view of the conversation thread and the live media view showing the current state of the conversation thread along with the interaction functionality actuators. FIGS. 6 and 7 show examples of these two different views.

FIG. 6 shows one example of a media feed view in which the current state of the conversation thread is displayed with actuators that allow the user to interact with the conversation thread. FIG. 7 shows one example of a static email view in which the notification email is displayed, but the current state of the conversation thread, and the actuators providing interaction functionality, are not displayed. In FIG. 6, the conversation thread includes a sender portion 272 and a comment portion 274. The sender portion identifies the user that made the comment in the comment portion 274. FIG. 6 also shows that the conversation thread includes a graphic 276 as well as a link 278 to a slide presentation. Similarly, the view illustrated in FIG. 6 includes a set of actuators 280 (such as a like actuator that allows the user to express a sentiment about the comment, a message actuator and a share actuator) that provide interaction functionality so that the user can actuate those actuators to interact with the conversation thread. Similarly, the view illustrated in FIG. 6 includes a text box 282 so that the user can post a message to the conversation thread. FIG. 6 also shows that, in one example, the view includes an actuator 284 that allows the user to switch to the static email view of the notification email message.

FIG. 7 shows one example of a static email view of the notification email message. It can be seen that the static email view in FIG. 7 includes a summary portion 286 that summarizes the most recent interaction that a user had with the conversation thread. However, the actuators 280 and text box 282 are not provided so that the user cannot interact with the conversation thread from the static email view in the same way as from the media feed view shown in FIG. 6. FIG. 7 also shows that the static email view illustratively includes an actuator 288 that the user can actuate in order to see the media feed view illustrated in FIG. 6.

Figure 8:
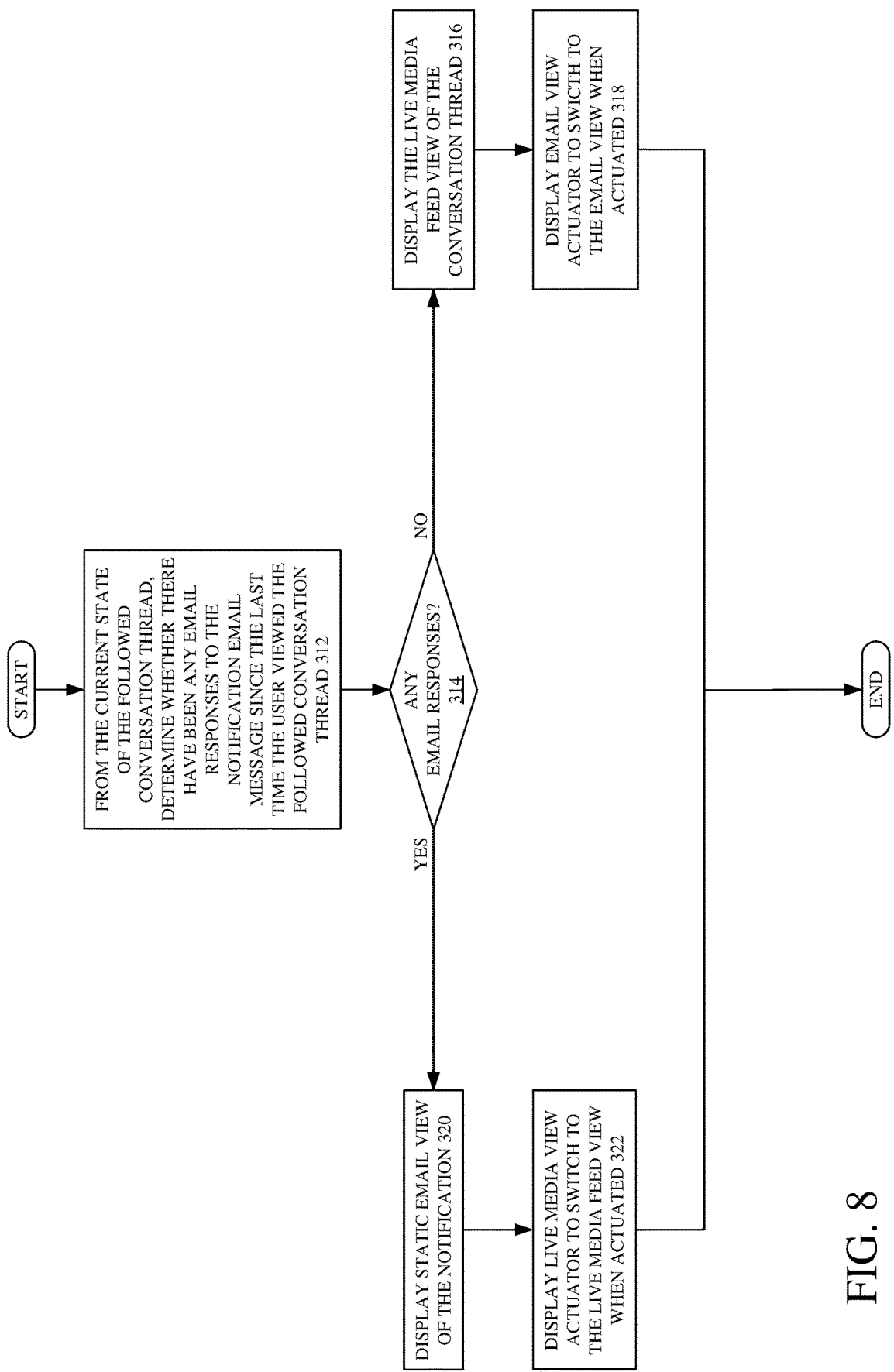
FIG. 8 is a flow diagram illustrating the operation of the computing system architectures in allowing a user to switch between an email view and a media feed view of the conversation thread within the message viewer of an inbox.

FIG. 8 is a flow diagram illustrating one example of the operation of the architectures shown in FIGS. 1 and 2 in determining a default view of the current state of the conversation thread to display when the user selects the notification email message. For example, it may be that another user has replied to the notification email message so that if the system automatically displayed the live media feed view of the current state of the conversation thread, the user may not see that reply email. Therefore, in accordance with one example, the email system first determines whether there have been any reply email messages and then, based upon the result of that determination, selects a default view to display (e.g., the static email view or the live media feed view) to the user. In one example, if there has been a reply email message, then the system selects the static email view as the default view so that the user will see the reply message. If there has been no reply message, then the system selects the live media feed view as the default view so that the user can easily see the current state of the conversation thread and engage the interactive functionality and actuators from within the message viewer (e.g., reading pane) of the user's inbox.

In one example, the email system that has received the notification email message (e.g., the alternative representation retrieval component 152 in FIG. 1 or the thread component 210 in FIG. 2) determines, based upon the current state of the conversation thread, whether there have been any email responses to the notification email message since the user last viewed the conversation thread. This is indicated by block 312 in the flow diagram of FIG. 8.

If there have not been any email responses, then the email system defaults to displaying the live media feed view of the conversation thread, with the actuators to provide the interactive functionality. This is indicated by blocks 314 and 316 in FIG. 8. The email system then displays the email view actuator (such as actuator 284 shown in FIG. 6) so that the user 162 can actuate it to switch to the email view, if desired. This is indicated by block 318. If, at block 314, it is determined that there has been at least one email response to the notification email message, then the email system selects the static email view (such as that shown in FIG. 7) of the notification email message and displays that view. This is indicated by block 320 in the flow diagram of FIG. 8. In such an example, the email system may also display the live media view actuator (such as actuator 288 shown in FIG. 7) that can be actuated by user 162 to switch to the live media feed view shown in FIG. 6. Displaying the live media view actuator is indicated by block 322 in the flow diagram of FIG. 8.

It can thus be seen that the present discussion provides a system which may receive a notification email from a conversation system. When the user selects the notification email message for display, the present discussion proceeds with respect to a system that obtains rendering information that can be used to render a current state of the conversation thread represented in the notification email message, to the user, within the message viewer (e.g., reading pane) of the user's inbox. The rendered display may also include actuators that allow the user to engage in interactive functionality provided by the underlying conversation system, with the conversation thread.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
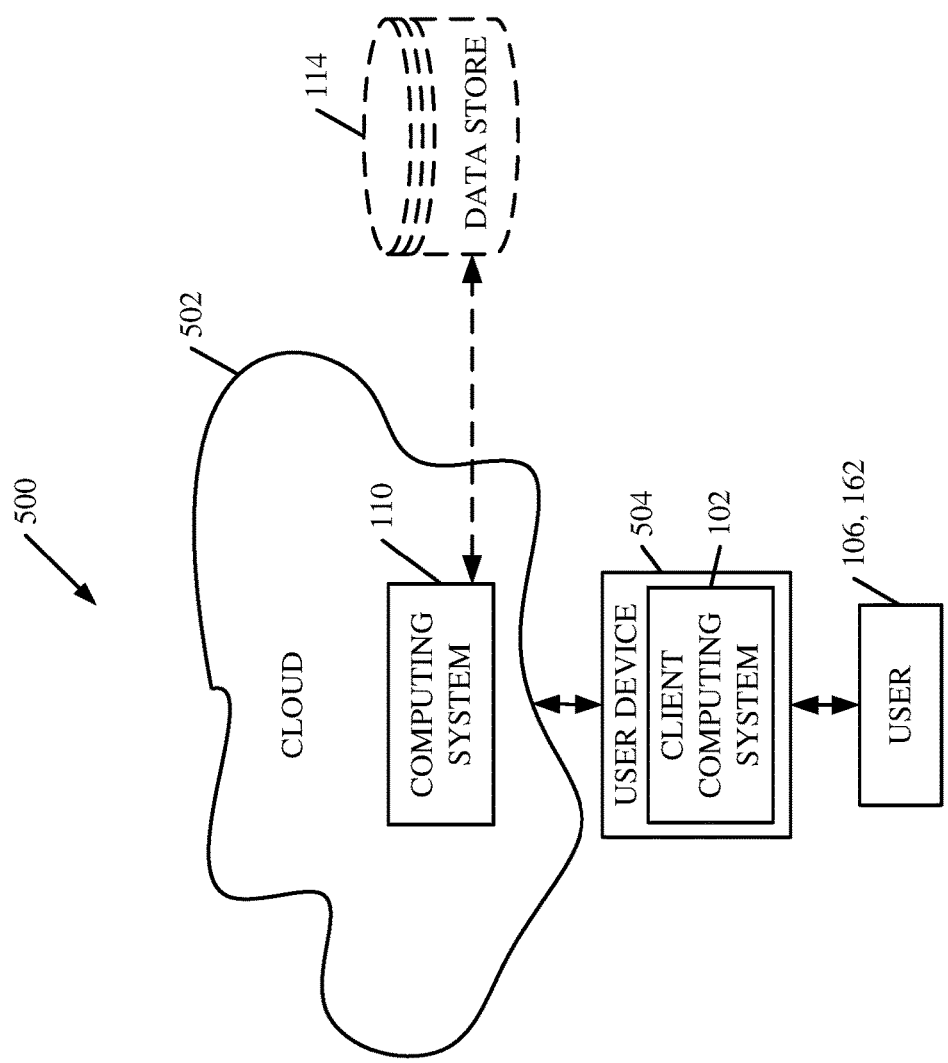
FIG. 9 is a block diagram showing one example of the computing system architecture illustrated in FIGS. 1 and 2, in a cloud computing architecture.

FIG. 9 is a block diagram of an architecture in which computing systems 102 and 110 are shown in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIGS. 1 and 2 and they are similarly numbered. FIG. 9 specifically shows that computing system 110 can be located in cloud 502 (which can be public, private, or a combination where portions are public while others are private). Therefore, user 162 uses a user device 504 to access those systems through cloud 502.

FIG. 9 also depicts another example of a cloud architecture. FIG. 9 shows that it is also contemplated that some elements of computing system 110 can be disposed in cloud 502 while others are not. By way of example, data store 114 can be disposed outside of cloud 502, and accessed through cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
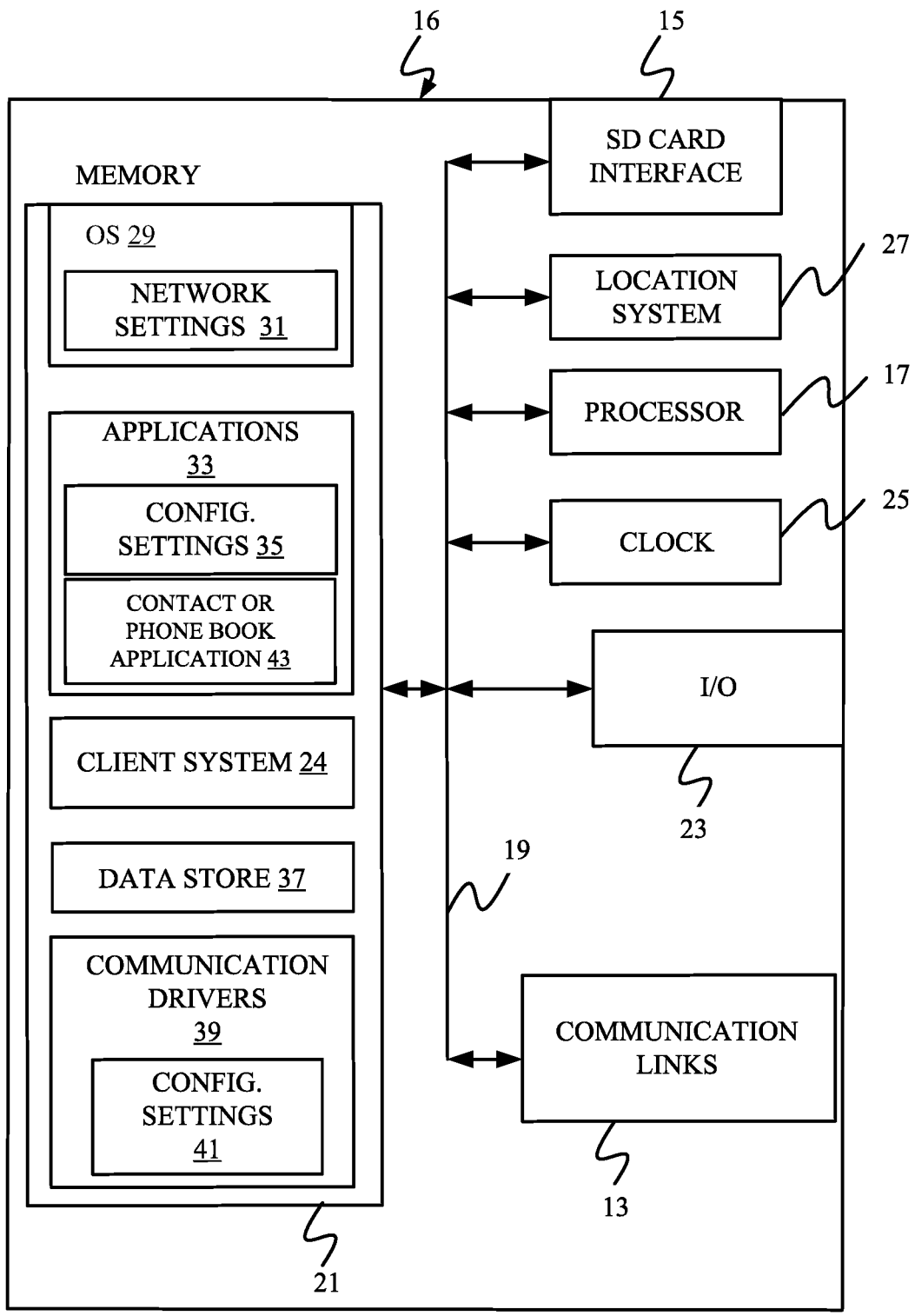
FIGS. 10-12 show examples of mobile devices that can be used in the architectures shown in the previous figures.
Figure 11:
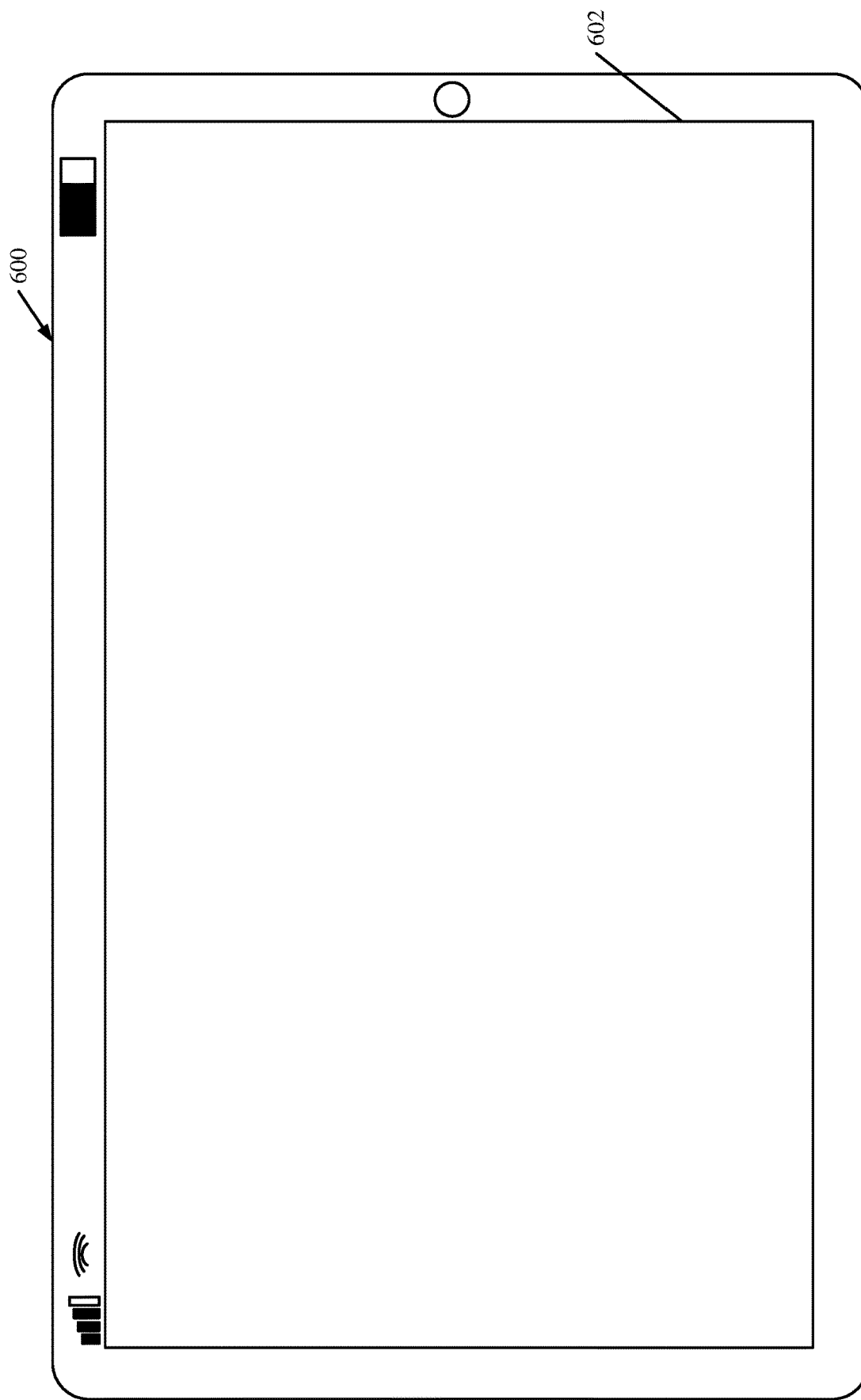
Figure 12:
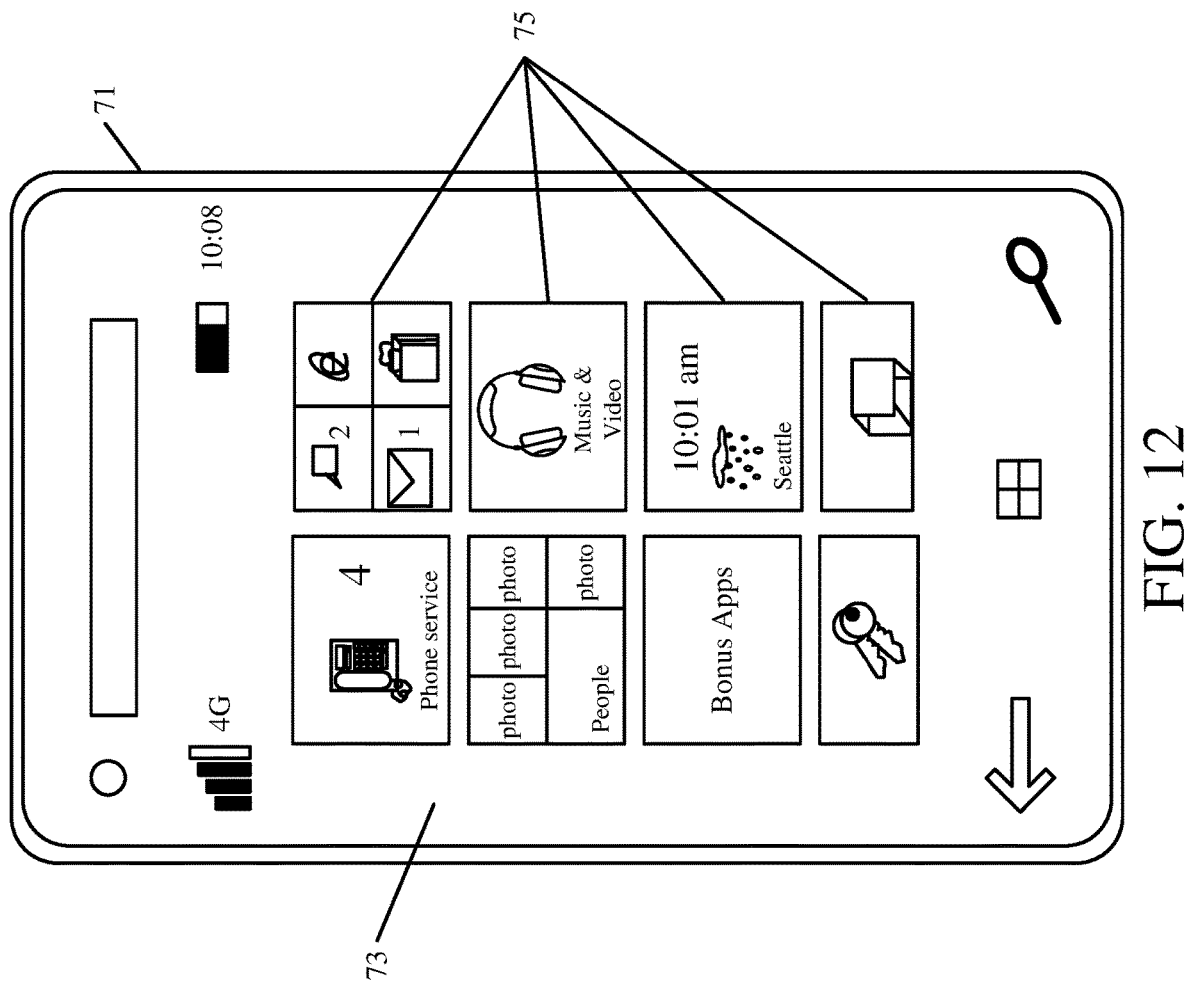

FIG. 10 is a simplified block diagram of one illustrative example of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components computing system 110 or user device 504 or system 116 or that interacts with architecture 100, or architecture 200 or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G and 5G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
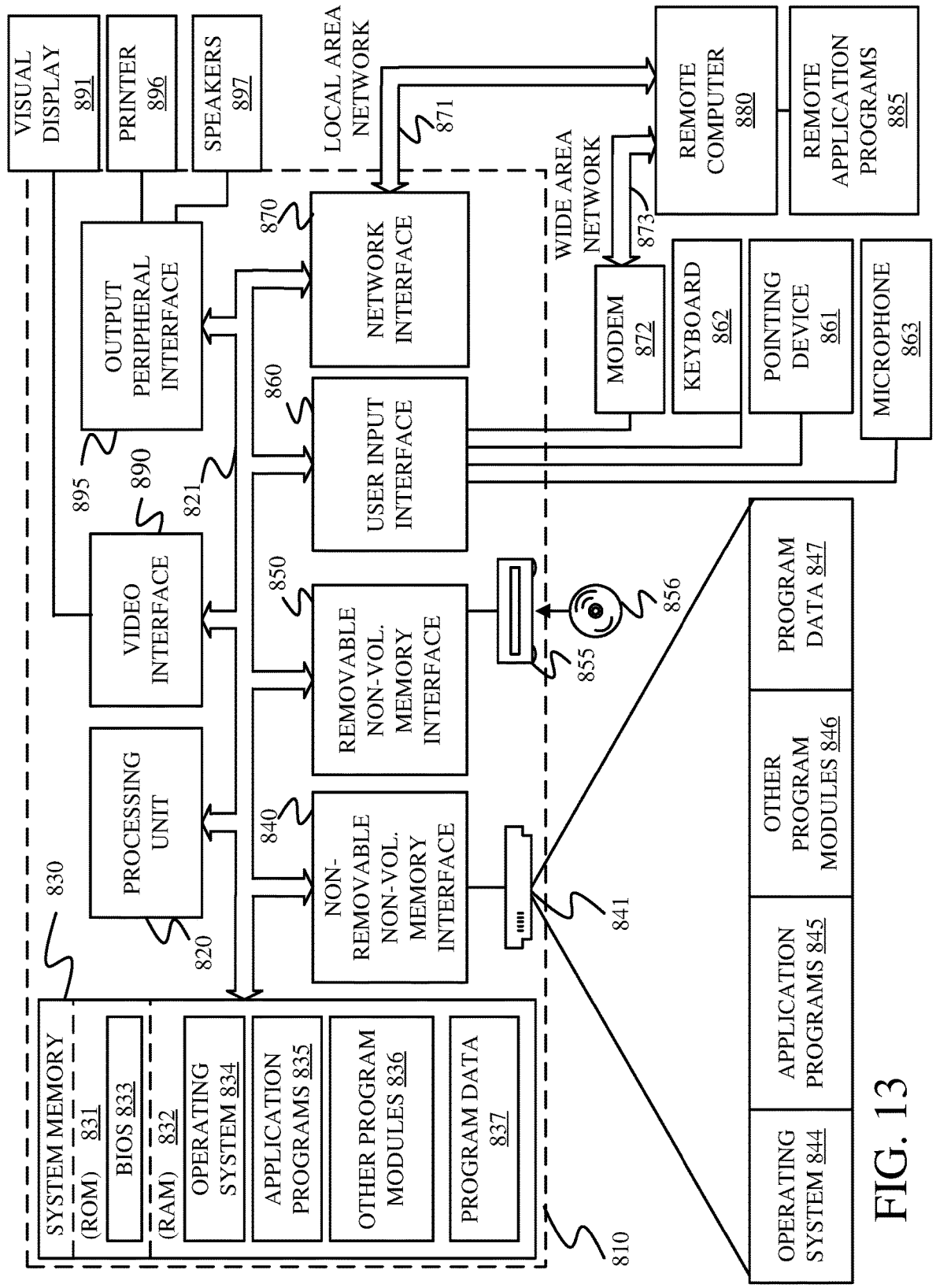
FIG. 13 is a block diagram showing one example of a computing environment that can be used in the architectures shown in the previous figures.

FIG. 13 is one example of a computing environment in which architecture 100, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:

a messaging system detecting a notification message, from a conversation system, the notification message being indicative of a change to a state of a conversation thread at the conversation system, the messaging system detecting a user selection input selecting the notification message;

a rendering information component that obtains rendering information for rendering a current state of the conversation thread with a set of actuators that are actuatable to perform conversation system functionality relative to the conversation thread; and an interactive functionality component that generates a representation of a conversation view showing the current state of the conversation thread, with the set of actuators, rendered in a message viewer of the messaging system, based on the rendering information.

Example 2 is the computer system of any or all previous examples and further comprising:

a thread interaction detection component detecting user actuation of an actuator in the set of actuators and sending an indication of the actuation to the conversation system to update the state of the conversation thread, to an updated state of the conversation thread, based on the user actuation.

Example 3 is the computer system of any or all previous examples wherein the interactive functionality component is configured to generate a representation of the conversation view to render the updated state of the conversation thread in the message viewer of the messaging system.

Example 4 is the computer system of any or all previous examples wherein the messaging system comprises a web application email server accessible by a client computing system through a browser and wherein the rendering information component comprises:

a thread component corresponding to the conversation system and configured to generate the rendering information to render the current state of the conversation thread.

Example 5 is the computer system of any or all previous examples wherein the messaging system comprises:

an email client system; and an alternate representation retrieval component that accesses an alternative representation generator in a message service to obtain the rendering information.

Example 6 is the computer system of any or all previous examples wherein the alternative representation generator comprises a JSON string generator in a message service that generates a JSON string indicative of the rendering information and wherein the alternate representation retrieval component is configured to render the current state of the conversation thread, with the set of actuators, in a reading pane of an inbox of the email client system based on the JSON string.

Example 7 is the computer system of any or all previous examples wherein the conversation system comprises a media system that generates a media feed that includes the conversation thread and wherein the interactive functionality component is configured to render the current state of the conversation thread with a set of media feed actuators which, when actuated in the media feed in the media system, cause the conversation system to perform thread interaction functionality.

Example 8 is the computer system of any or all previous examples wherein interaction functionality component is configured to generate the representation of the conversation view with a switch view actuator which is actuatable to switch to a static view showing the notification message.

Example 9 is the computer system of any or all previous examples wherein the messaging system comprises an email system and the notification message comprises a notification email message, the email system being configured to detect the notification email message by detecting a conversation thread identifier, in a header of the notification email message, indicative of the conversation thread in the conversation system.

Example 10 is a computer implemented method, comprising:

detecting a notification message, from in a conversation system, in a messaging system, the notification message being indicative of a change to a state of a conversation thread at the conversation system;

obtaining rendering information for rendering a current state of the conversation thread with a set of actuators that are actuatable to perform conversation system functionality relative to the conversation thread; and rendering a conversation view showing the current state of the conversation thread, with the set of actuators, in a message viewer of the messaging system, based on the rendering information.

Example 11 is the computer implemented method of any or all previous examples and further comprising:

detecting user actuation of an actuator in the set of actuators; and sending an indication of the actuation to the conversation system to update the state of the conversation thread, to an updated state of the conversation thread, based on the user actuation.

Example 12 is the computer implemented method of any or all previous examples and further comprising:

rendering the updated state of the conversation thread in the message viewer of the messaging system.

Example 13 is the computer implemented method of any or all previous examples wherein the messaging system comprises a web application email server and a thread component corresponding to the conversation system and wherein obtaining rendering information comprises:

accessing the thread component to obtain the rendering information to render the current state of the conversation thread.

Example 14 is the computer implemented method of any or all previous examples wherein the messaging system comprises an email client system and wherein obtaining rendering information comprises:

accessing an alternative representation generator in a message service to obtain the rendering information to render the current state of the conversation thread.

Example 15 is the computer implemented method of any or all previous examples wherein the alternative representation generator comprises a JSON string generator that generates a JSON string indicative of the rendering information and wherein rendering comprises:

rendering the current state of the conversation thread, with the set of actuators, in a reading pane of an inbox of the email client system based on the JSON string.

Example 16 is the computer implemented method of any or all previous examples wherein the conversation system comprises a media system that generates a media feed with the conversation thread and wherein rendering the current state of the conversation thread, with the set of actuators, comprises:

rendering, as the set of actuators, a set of media feed actuators which, when actuated, cause the conversation system to perform thread interaction functionality.

Example 17 is the computer implemented method of any or all previous examples wherein rendering the set of media feed actuators comprises:

rendering a text box that is actuatable to receive a comment and post the comment to the conversation thread; and rendering a sentiment actuator that is actuatable to post a sentiment to the conversation thread.

Example 18 is the computer implemented method of any or all previous examples wherein rendering the conversation view with the set of actuators comprises:

rendering a switch view actuator which is actuatable to switch to a static messaging system view showing the notification message.

Example 19 is the computer implemented method of any or all previous examples wherein rendering comprises:

determining whether a reply message has been sent in the messaging system in reply to the notification message; and if so, rendering the notification message, with a switch view actuator which is actuatable to switch to the conversation view.

Example 20 is an electronic mail (email) computer system, comprising:

a conversation message identifier detecting a notification email message, from a conversation system, in an inbox of an email system, the notification email message being indicative of a change to a state of a conversation thread at the conversation system, the email system detecting a user selection input selecting the notification email message;

a rendering information component that obtains rendering information for rendering a current state of the conversation thread with a set of actuators that are actuatable to perform conversation system functionality relative to the conversation thread; and an interactive functionality component that renders a conversation view showing the current state of the conversation thread, with the set of actuators, in a reading pane of the inbox of the email system, based on the rendering information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:

at least one processor; and memory storing instructions executable by the at least one processor, wherein the instructions, when executed, cause the computer system to:

generate a message viewer of a messaging system, the message viewer configured to render messages associated with a user received by the messaging system;

detect a notification message, from a conversation system, the notification message including a conversation thread identifier that identifies a conversation thread in the conversation system and being indicative of a change to a state of the conversation thread at the conversation system;

based on detection of a user selection input, select the notification message and obtain rendering information for rendering a current state of the conversation thread with a set of actuators that are actuatable to perform conversation system functionality relative to the conversation thread;

render, in the message viewer of the messaging system, a representation of a conversation view showing the current state of the conversation thread, with the set of actuators, based on the rendering information;

detect user actuation of an actuator in the set of actuators rendered in the message viewer;

send, to the conversation system based on the conversation thread identifier, an indication of the user actuation;

receive, from the conversation system, an updated state of the conversation thread, updated based on the user actuation; and render the updated state of the conversation thread in the message viewer of the messaging system.

2. The computer system of claim 1 wherein the messaging system comprises a web application email server accessible by a client computing system through a browser and wherein the instructions cause the computer system to:

generate the rendering information to render the current state of the conversation thread.

3. The computer system of claim 1 wherein the messaging system comprises:

an email client system; and the instructions cause the computer system to:

access an alternative representation generator in a message service to obtain the rendering information.

4. The computer system of claim 3 wherein the alternative representation generator comprises a JSON string generator in a message service that generates a JSON string indicative of the rendering information and wherein the instructions cause the computer system to render the current state of the conversation thread, with the set of actuators, in a reading pane of an inbox of the email client system based on the JSON string.

5. The computer system of claim 1 wherein the conversation system comprises a media system that generates a media feed that includes the conversation thread and wherein the instructions cause the computer system to render the current state of the conversation thread with a set of media feed actuators which, when actuated in the media feed in the media system, cause the conversation system to perform thread interaction functionality.

6. The computer system of claim 1 wherein the instructions cause the computer system to generate the representation of the conversation view with a switch view actuator which is actuatable to switch to a static view showing the notification message.

7. The computer system of claim 1 wherein the messaging system comprises an email system and the notification message comprises a notification email message, the instructions cause the computer system to detect the notification email message by detecting the conversation thread identifier, in a header of the notification email message, indicative of the conversation thread in the conversation system.

8. A computer implemented method, comprising:

detecting a notification message, from a conversation system, in a messaging system, the notification message including a conversation thread identifier that identifies a conversation thread in the conversation system and being indicative of a change to a state of the conversation thread at the conversation system;

obtaining rendering information for rendering a current state of the conversation thread with a set of actuators that are actuatable to perform conversation system functionality relative to the conversation thread;

rendering a conversation view in a message viewer of the messaging system based on the rendering information, the conversation view showing the current state of the conversation thread with the set of actuators;

detecting user actuation of an actuator in the set of actuators rendered in the message viewer;

sending, to the conversation system based on the conversation thread identifier, an indication of the user actuation;

receiving, from the conversation system, an updated state of the conversation thread, updated based on the user actuation; and rendering the updated state of the conversation thread in the message viewer of the messaging system.

9. The computer implemented method of claim 8 and further comprising:

sending the indication of the user actuation to the conversation system to update the state of the conversation thread, to the updated state of the conversation thread, based on the user actuation.

10. The computer implemented method of claim 8 wherein the messaging system comprises a web application email server and a thread component corresponding to the conversation system and wherein obtaining rendering information comprises:

accessing the thread component to obtain the rendering information to render the current state of the conversation thread.

11. The computer implemented method of claim 8 wherein the messaging system comprises an email client system and wherein obtaining rendering information comprises:

accessing an alternative representation generator in a message service to obtain the rendering information to render the current state of the conversation thread.

12. The computer implemented method of claim 11 wherein the alternative representation generator comprises a JSON string generator that generates a JSON string indicative of the rendering information and wherein rendering comprises:

rendering the current state of the conversation thread, with the set of actuators, in a reading pane of an inbox of the email client system based on the JSON string.

13. The computer implemented method of claim 8 wherein the conversation system comprises a media system that generates a media feed with the conversation thread and wherein rendering the current state of the conversation thread, with the set of actuators, comprises:

rendering, as the set of actuators, a set of media feed actuators which, when actuated, cause the conversation system to perform thread interaction functionality.

14. The computer implemented method of claim 13 wherein rendering the set of media feed actuators comprises:

rendering a text box that is actuatable to receive a comment and post the comment to the conversation thread; and rendering a sentiment actuator that is actuatable to post a sentiment to the conversation thread.

15. The computer implemented method of claim 8 wherein rendering the conversation view with the set of actuators comprises:

rendering a switch view actuator which is actuatable to switch to a static messaging system view showing the notification message.

16. The computer implemented method of claim 8 wherein rendering comprises:

determining whether a reply message has been sent in the messaging system in reply to the notification message; and if so, rendering the notification message, with a switch view actuator which is actuatable to switch to the conversation view.

17. An electronic mail (email) computer system, comprising:

at least one processor; and memory storing instructions executable by the at least one processor, wherein the instructions, when executed, provide:

a conversation message identifier configured to detect a notification email message, from a conversation system, in an inbox of an email system, the notification email message including a conversation thread identifier that identifies a conversation thread in the conversation system and being indicative of a change to a state of the conversation thread at the conversation system, the email system configured to detect a user selection input selecting the notification email message;

a rendering information component configured to obtain rendering information for rendering a current state of the conversation thread with a set of actuators that are actuatable to perform conversation system functionality relative to the conversation thread; and an interactive functionality component configured to:

render a conversation view showing the current state of the conversation thread, with the set of actuators, in a reading pane of the inbox of the email system, based on the rendering information;

detect user actuation of an actuator in the set of actuators rendered in the reading pane;

send, to the conversation system based on the conversation thread identifier, an indication of the user actuation;

receive, from the conversation system, an updated state of the conversation thread, updated based on the user actuation; and render the updated state of the conversation thread in the reading pane.

* * * * *